Patented Aug. 24, 1943

2,327,772

UNITED STATES PATENT OFFICE 2,327,772

PLASTICIZED AMINOPLAST

Gaetano F. D'Alelio, Pittsfield, Mass., assignor to General Electric Company, a corporation of New York No Drawing. Application January 16, 1941, Serial No. 374,736

17 Claims. (Cl. 260—33)

This invention relates to new and useful compositions having properties that render them particularly useful in the plastics and coating arts. More particularly the invention is concerned with compositions of matter comprising an aminoplast (more particularly heat-curable and heat-cured aminoplasts) modified, specifically plasticized, with a nitrogenous compound selected from the class consisting of (1) aryl compounds having attached to the aryl nucleus at least one sulfonamide radical and at least one radical containing the essential unit

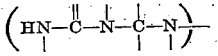

more particularly at least one ureidomethylamino radical, and (2) aldehyde reaction products of the aryl compounds of (1), which aryl compounds may be represented graphically by the formula (I) 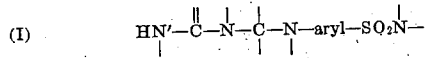

The sum of the radicals of Formula I that are introduced into the aryl nucleus may vary from two up to the combining power of the particular aryl nucleus. For example, taking a benzene nucleus as illustrative of the aryl radical, there may be attached thereto one, two or three

radicals and one, two or three

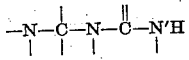

radicals, or one

radical and one to five

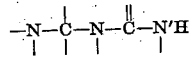

radicals, or one

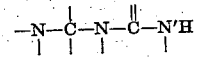

radical and one to five

radicals. The unsatisfied single valencies in the described radicals may be satisfied by hydrogen or any monovalent organic substituent, more particularly substituted or unsubstituted hydrocarbon radicals. The unsatisfied double valency in the radical

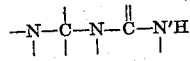

may be satisfied by a divalent atom or radical, e. g., oxygen, sulfur, selenium, =NH, etc. The only requirement of the aryl compound is that it contain at least one N-substituted (partly or completely substituted) or N-unsubstituted sulfonamide radical and that in the other above-identified essential radical there be attached to the nitrogen atom identified as N' in the Formula I at least one hydrogen atom, as a result of which the compounds are reactable with an aldehyde, e. g., formaldehyde, and therefore can intercondense under heat with the other components of the aminoplast (or with the partially formed aminoplast) thereby to become an integral part of the resinous mass.

As is well known, aminoplasts are synthetic resins derived from amino (including imino) or amido (including imido) compounds, a typical example being urea-formaldehyde resin (reference: Modern Plastics, vol. 17, No. 2, October, 1939, page 433; U. S. Patent 2,214,851, D'Alelio). Other examples of aminoplasts are aminotriazine-aldehyde resins (e. g. melamine-formaldehyde resins), urea - aminotriazine - aldehyde resins, aminodiazine-aldehyde resins, protein-aldehyde resins, (e. g., casein-formaldehyde resins), aniline-aldehyde condensation products, benzene disulfonamide-aldehyde resins, sulfanilamide-aldehyde resins, resinous condensation products of aldehydes such as formaldehyde with polyamides as, for instance, malonic diamide, maleic diamide, fumaric diamide, itaconic diamide, etc.

In the commercial utilization of aminoplasts in the plastics and coating arts, it is frequently necessary to modify the potentially heat-curable aminoplast by incorporating therein a plasticizer in order that the aminoplast will flow properly in the particular coating composition or, in the case of thermosetting aminoplast molding compositions, will show good flow characteristics during molding. If improper or insufficient plastic flow occurs during the molding operation, the molded articles may show streaked or wavy surfaces. Furthermore, if the plasticity of the molding composition is not sufficient, lack of physical homogeneity as the result of incompletely knitted granules often characterizes massive moldings.

From the foregoing it will be seen that particularly in the molding of heat-curable, plasticized aminoplasts it is important that the plasticizer have certain physical characteristics. It should improve the flow of the molding compound during molding without retarding the curing of the resin at molding temperatures. It should be compatible with the aminoplast both at normal and at elevated temperatures and should not "bleed" from the aminoplast during or after molding. It should not discolor, or impart an odor to, or lessen the water resistance, electrical properties, mechanical strength and other useful properties of the cured aminoplast. The substances that are able to meet these requisites are extremely rare. Urea and various substituted ureas, phenols, aniline, toluene sulfonamides and acid bodies heretofore have been used or suggested as plasticizers for aminoplasts, but none has been entirely satisfactory. In most cases the improvement in plasticity was attained at the sacrifice of some other useful property. For example, the addition of urea decreases the water resistance of the molded article. Phenols impart color and odor, while aniline not only imparts color and odor but also retards the cure of the resin during molding.

I have discovered that mono and poly aryl compounds having attached to the aryl nucleus at least one sulfonamide radical and at least one radical containing the essential unit

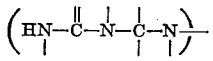

more particularly at least one ureidomethylamino radical, and aldehyde reaction products of such aryl compounds constitute a class of materials that meet the above-mentioned requirements for a plasticizer for aminoplasts. These organic compounds not only effectively plasticize the heat-convertible aminoplasts so that the aminoplast has good flow characteristics during molding, but they accomplish this result without retarding the curing of the aminoplast during molding. Furthermore, the aminoplast is internally plasticized without any noticeable decrease in the other valuable properties of the heat-hardened aminoplast, such as heat- and water-resistance, dielectric strength, mechanical strength, surface appearance, color, odor, etc. Another advantage accruing from the use of these organic compounds is that they are able to intercondense with the potentially reactive aminoplast and, therefore, cannot "bleed" from the molding composition or molded article since they become an integral part of the resin molecule. Also, larger amounts of plasticizer can be tolerated in the compositions than usually has been possible with otherwise plasticized aminoplasts, and yet not impair the water resistance of the molded article. These results were quite surprising and unexpected, since in no way could it have been predicted from the known properties of these organic compounds or of aminoplasts that such compounds not only would serve effectively to plasticize the heat-curable aminoplast but would do this without retarding its curing rate and without sacrifice of the useful properties of the cured aminoplast.

The organic compounds with which aminoplasts are plasticized in accordance with the teachings of the present invention may be described more particularly as compounds having the graphic formula (II) 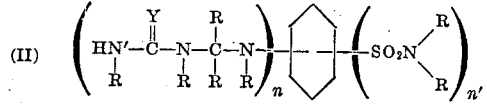

where

represents a mono or poly aromatic nucleus, e. g., benzene, halogeno aromatic (e. g., halogeno benzene), alkylated aromatic (e. g., alkylated benzene), hydroxylated aromatic (e. g., hydroxy benzene), alkoxy aromatic (e. g., alkoxy benzene), aryloxy aromatic (e. g., phenoxy benzene), acetoxy aromatic (e. g., acetoxy benzene), carboalkoxy aromatic (e. g., carboalkoxy benzene), arylated benzene (e. g., phenyl benzene), naphthalene, etc., nuclei. R may be either hydrogen or a monovalent organic radical, more particularly a substituted or unsubstituted hydrocarbon radical, e. g., aryl (including naphthyl), aralkyl, alkyl, alkaryl, acyl, hydrocyclic, heterocyclic, etc., radicals, or nitro, halogeno, carboalkoxy, acetoxy, amido, imido, amino, nitrilo, etc., derivatives of such radicals. I prefer to use compounds wherein R represents hydrogen. Y may be a divalent atom or radical, examples of which have been given heretofore with reference to the unsatisfied double valency of the carbon atom to which Y is attached, but preferably is either oxygen or sulfur. In Formula II $n$ and $n'$ are integers and each is at least 1, the sum of $n$ and $n'$ varying from 2 up to the combining power of the particular nucleus.

More specific examples of compounds comprising the plasticizers used in carrying the present invention into effect are listed below:

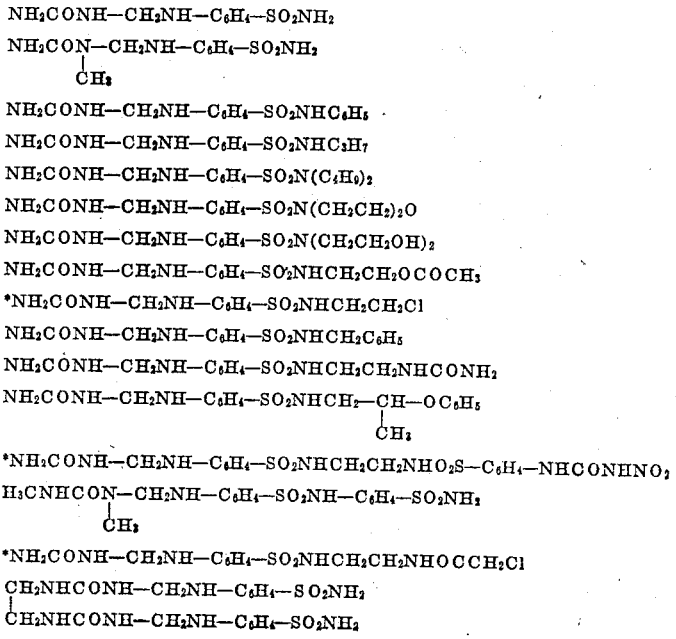

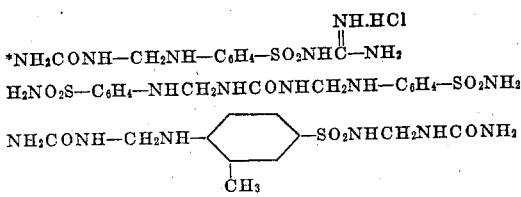

Additional examples of compounds that may be employed are the aldehyde, specifically formaldehyde, reaction products of compounds such as above mentioned by way of illustration and wherein the =NH,

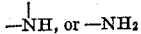

groups are converted into alkylol, specifically methylol derivatives, e. g.,

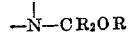

or alkylene, specifically methylene, derivatives, e. g., —N=CR$_2$, where R is hydrogen, alkyl, aryl, etc.

A further advantage accrues from my invention when certain particular compounds are employed. For example, compounds of the class exemplified by the specific examples marked with an asterisk in the above list are able not only effectively to plasticize the composition but also function as curing reactants, that is, their incorporation into the resin or a molding composition prepared therefrom accelerates the conversion under heat of the heat-convertible aminoplast from a soluble, fusible state to an insoluble, infusible condition.

*Example 1*

A heat-convertible molding composition comprising 55–65 parts by weight potentially reactive urea-formaldehyde partial condensation product, a small amount of a curing reagent and 35–45 parts alpha cellulose in flock form were dried and ball milled with from 2 to 10 parts of a ureidomethylaminobenzenesulfonamide of the formula

in the presence of the usual mold lubricants, dyes, etc. The finely ground powder was densified in the usual manner and molded at 130° to 150° C. under a pressure of about 2,000 pounds per square inch. In a similar way molding compositions and molded articles were prepared wherein the described plasticizer was omitted from the formulation. In all cases, better knitting and fusion took place and there was higher plastic flow per unit time in compositions containing the plasticizer as compared with the plasticizer-free composition. Furthermore, there was no decrease in the water resistance of the molded article prepared from the described plasticized aminoplast.

In a specific case wherein 5% by weight (of the compound) of

was incorporated into a filled, plasticizer-free urea-formaldehyde molding compound, tests were made with a double-sphere photometer to determine the comparative light transmission of the plasticized and non-plasticized molded compounds in the form of thin discs. The improved translucency of the plasticized material is shown by the fact that it showed about 26% light transmission, whereas the non-plasticized product transmitted only 4% light. The plasticizer free compound showed practically no plastic flow and did not knit or fuse together very well during molding. The plasticized compound, on the other hand, showed excellent plastic flow during molding and yielded molded articles that were well knitted or fused together into a strong molded piece of excellent surface characteristics.

Substantially the same results, as above described, are obtained when molding compositions comprising potentially reactive, filled melamine-formaldehyde and melamine-urea-formaldehyde resins are substituted for the filled urea-formaldehyde molding composition.

More specific examples of aminoplasts which may be plasticized with the hereindescribed plasticizers are reaction products of aldehydes, for example formaldehyde or compounds engendering formaldehydes (e. g., paraformaldehyde, hexamethylene tetramine, etc.), with amido, imido, amino or imino compounds, or suitable mixtures thereof, for instance urea, thiourea, diurea, hydroxy urea, ethanol urea, unsymmetrical diphenyl urea, diethylene thiurea, methyl urea, acetyl urea, phenyl thiourea, asymmetrical diethyl urea, allyl urea, 2-chlorallyl urea, ethylidene urea, methylol ureas, methylene ureas, guanidine (iminourea), dicyandiamide, (cyanoiminourea), guanyl urea, guanyl thiourea, biguanidine, aminodiazines, aminotriazines, aminodiazoles, creatinine, guanoline, etc. In many cases the use of an aminotriazine, e. g., melamine, alone or in conjunction with other amido, amino, imido or imino compounds, yields particularly valuable aminoplasts which may be internally modified in accordance with the present invention. Illustrative examples of aminotriazines that may be employed are given in various copending applications of mine, for example in copending application Serial No. 365,379, filed November 12, 1940, now Patent No. 2,322,567, issued June 22, 1943, and assigned to the same assignee as the present invention. Suitable mixtures of aminotriazines also may be employed. All of these amido, imido, amino and imino compounds are aldehyde-reactable and all contain at least one active

group.

Aldehydes other than formaldehyde or compounds engendering formaldehyde also may be employed in producing the aminoplast, for instance acetaldehyde, proprionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes.

As aminoplasts I prefer to use potentially heat-curable resinous reaction products of ingredients comprising, for example, urea and formaldehyde, or an aminotriazine (e. g., melamine) and formaldehyde, or urea, melamine and formaldehyde. The hereindescribed plasticizer reactant or modifier may be incorporated into the resin along with the other reactants, or during or after formation of the partial condensation product, or during the preparation of the molding composition. For example, the plasticizer component may be incorporated into the resin or molding composition as described more specifically in, for example, my copending application Serial No. 346,962, filed July 23, 1940, with particular reference to suitable technique for incorporating a malonic ester into an aminoplast composition. The potentially heat-convertible aminoplasts and molding (moldable) compositions containing the same may be prepared as described in the above-identified copending application and in various other copending applications, for example application Serial No. 363,036, filed October 26, 1940, now Patent No. 2,320,817, issued June 1, 1943, and assigned to the same assignee as the present invention.

The amount of plasticizer reactant which is incorporated into the potentially reactive aminoplast or molding composition made therefrom may be varied as desired or as conditions may require, but ordinarily is employed in an amount corresponding approximately to from 0.1 to 10 or 12% by weight of the aminoplast, from 0.5 to 4 or 5% being generally satisfactory for the usual aminoplasts.

Thermosetting molding compositions comprising potentially heat-curable aminoplasts plasticized with the plasticizer reactant herein described may be molded into a variety of shapes under heat and pressure, more particularly at temperatures of the order of 100° to 200° C., preferably from approximately 120° to 180° C. The plasticized compositions show good plastic flow during molding. Molded articles of manufacture comprising the molded heat-hardened molding compositions of this invention have a good surface finish, show no evidence of "bleeding" plasticizer, are well cured throughout, and show no appreciable loss in any of their other useful properties due to the presence of the plasticizer.

What I claim as new and desire to secure by Letters Patent of the United States is:

1. A composition of matter comprising an aminoplast modified with a nitrogeneous compound selected from the class consisting of (1) aryl compounds having attached to the aryl nucleus at least one sulfonamide radical and at least one ureidomethylamino radical and (2) aldehyde reaction products of the aryl compounds of (1).

2. A composition of matter comprising an aminoplast modified with a mono-aryl compound having attached to the aryl nucleus at least one sulfonamide radical and at least one ureidomethylamino radical.

3. A composition of matter comprising an aminoplast modified with an aldehyde reaction product of a mono-aryl compound having attached to the aryl nucleus at least one sulfonamide radical and at least one ureidomethylamino radical.

4. A composition of matter comprising an aminoplast modified with an aryl compound having attached to the aryl nucleus at least one sulfonamide radical and at least one radical having the structure —NHCH$_2$NHCONH$_2$.

5. A composition of matter comprising a potentially reactive aminoplast modified with a mono-aryl compound having attached to the aryl nucleus at least one sulfonamide radical and at least one radical having the structure

—NHCH$_2$NHCONH$_2$.

6. A composition of matter comprising an amino-plast modified with a mono-aryl compound having attached to the aryl nucleus a single —SO$_2$NH$_2$ radical and a single

—NHCH$_2$NHCONH$_2$ radical.

7. A heat-curable composition comprising a potentially reactive aminoplast modified with a nitrogenous compound selected from the class consisting of (1) aryl compounds having attached to the aryl nucleus at least one sulfonamide radical and at least one ureidomethylamino radical and (2) aldehyde reaction products of the aryl compounds of (1).

8. A product comprising the cured composition of claim 7.

9. A heat-hardenable molding composition comprising a filler, a potentially reactive condensation product of ingredients comprising urea and formaldehyde, and a mono-aryl compound having attached to the aryl nucleus at least one sulfonamide radical and at least one radical having the structure —NHCH$_2$NHCONH$_2$.

10. An article of manufacture comprising the heat-hardened molding composition of claim 9.

11. A composition comprising a condensation product of ingredients comprising urea and formaldehyde, and a modifier of said condensation product comprising an organic compound having the formula

NH$_2$CONH—CH$_2$NH—C$_6$H$_4$—SO$_2$NH$_2$

12. A composition comprising a condensation product of ingredients comprising urea, melamine and formaldehyde, said condensation product being modified with an organic compound having the formula

NH$_2$CONH—CH$_2$NH—C$_6$H$_4$SO$_2$NH$_2$

13. A composition comprising a condensation product of ingredients comprising urea and formaldehyde, and a modifier of said condensation product comprising an aldehyde reaction product of an organic compound having the formula

NH$_2$CONH—CH$_2$NH—C$_6$H$_4$—SO$_2$N(CH$_2$CH$_2$)$_2$O

14. A composition comprising a condensation product of ingredients comprising urea and formaldehyde, and a modifier of said condensation product comprising an organic compound having the formula

NH$_2$CONH—CH$_2$NH—C$_6$H$_4$—

SO$_2$NHCH$_2$CH$_2$NHOCCH$_2$Cl

15. The method of plasticizing an aminoplast which comprises incorporating into the potentially reactive aminoplast under heat a nitrogenous compound selected from the class consisting of (1) aryl compounds having attached to the aryl nucleus at least one sulfonamide radical and at least one ureidomethylamino radical and (2) aldehyde reaction products of the aryl compounds of (1).

16. A composition comprising a condensation product of ingredients comprising a urea and an aldehyde, said condensation product being modified with a nitrogenous compound selected from the class consisting of (1) aryl compounds having attached to the aryl nucleus at least one sulfonamide radical and at least one ureidomethylamino radical, and (2) aldehyde reaction products of the aryl compounds of (1).

17. A composition comprising a condensation product of ingredients comprising a urea, an aminotriazine and an aldehyde, said condensation product having intercondensed therein an aryl compound having attached to the aryl nucleus at least one sulfonamide radical and at least one unreidomethylamino radical.

GAETANO F. D'ALELIO.

CERTIFICATE OF CORRECTION.

Patent No. 2,327,772. August 24, 1943.

GAETANO F. D'ALELIO.

It is hereby certified that error appears in the printed specification of the above numbered patent requiring correction as follows: Page 3, first column, line 75, for "plasticizer free" read --plasticizer-free--; and second column, line 18, for "formaldehydes" read --formaldehyde--; line 23, for "thiurea" read --triurea--; line 53, for "proprionaldehyde" read --propionaldehyde--; page 4, first column, line 37, claim 1, for "nitrogeneous" read --nitrogenous--; and second column, line 31, claim 12, for that portion of the formula reading "$C_6H_4SO_2NH_2$" read --$C_6H_4$—$SO_2NH_2$--; page 4, second column, line 72, claim 17, for "unreidomethylamino" read --ureidomethylamino--; and that the said Letters Patent should be read with this correction therein that the same may conform to the record of the case in the Patent Office.

Signed and sealed this 19th day of October, A. D. 1943.

(Seal)

Henry Van Arsdale,
Acting Commissioner of Patents.